3 Sheets—Sheet 1.

J. BARKER.

SHUTTLE BOX MOTION FOR LOOMS.

No. 10,119. Reissued May 23, 1882.

WITNESSES

John J. Ellis

J. Wm. Mister

INVENTOR

Jno. Barker by H. W. Anderson his ATTORNEY

N. PETERS, Photo-Lithographer, Washington, D. C.

J. BARKER.

SHUTTLE BOX MOTION FOR LOOMS.

No. 10,119. Reissued May 23, 1882.

WITNESSES

John Stein.

J. Wm. Mister

INVENTOR

Jno Barker by E. W. Anderson his ATTORNEY

N. PETERS. Photo-Lithographer, Washington, D. C.

J. BARKER.

SHUTTLE BOX MOTION FOR LOOMS.

No. 10,119. Reissued May 23, 1882.

WITNESSES

John Mewis.

J. Wm. Meister

INVENTOR

Jno. Barker

By E. W. Anderson his ATTORNEY

N. PETERS, Photo-Lithographer, Washington, D. C.

UNITED STATES PATENT OFFICE.

JOHN BARKER, OF WHITTENTON, MASSACHUSETTS.

SHUTTLE-BOX MOTION FOR LOOMS.

SPECIFICATION forming part of Reissued Letters Patent No. 10,119, dated May 23, 1882.

Original No. 211,126, dated January 7, 1879. Application for reissue filed June 6, 1879.

*To all whom it may concern:*

Be it known that I, JOHN BARKER, of Whittenton, (Taunton P. O.,) in the county of Bristol and State of Massachusetts, have invented a new and Improved Shuttle-Box Motion for Looms, of which the following is a full, clear, and exact description, sufficient to enable others skilled in the art to which my invention appertains to make and use the same, reference being had to the accompanying drawings, and to the letters of reference marked thereon, and in which drawings—

Figure 1:
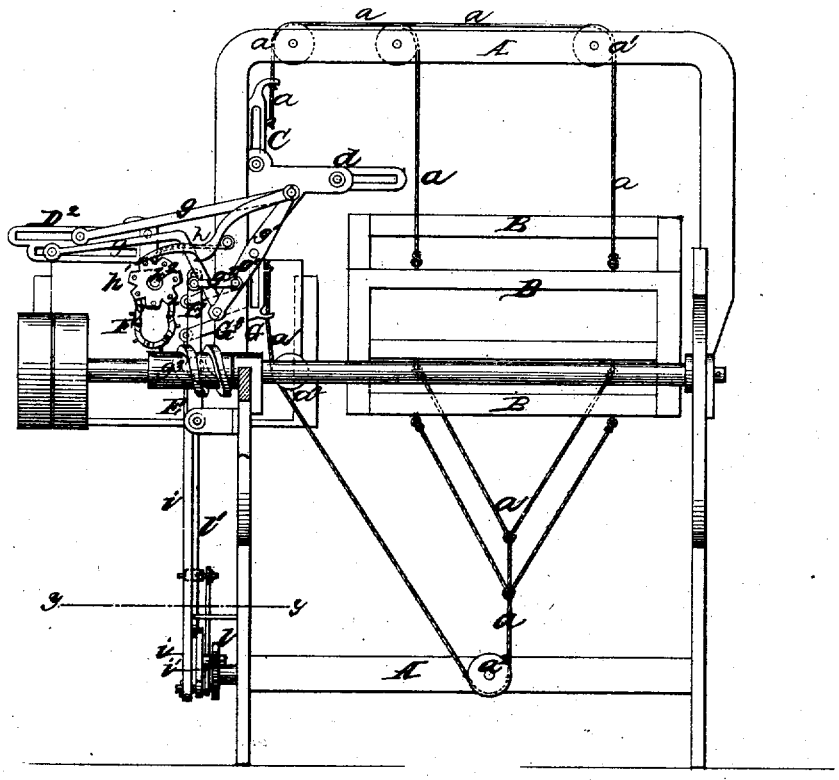
Figure 2:
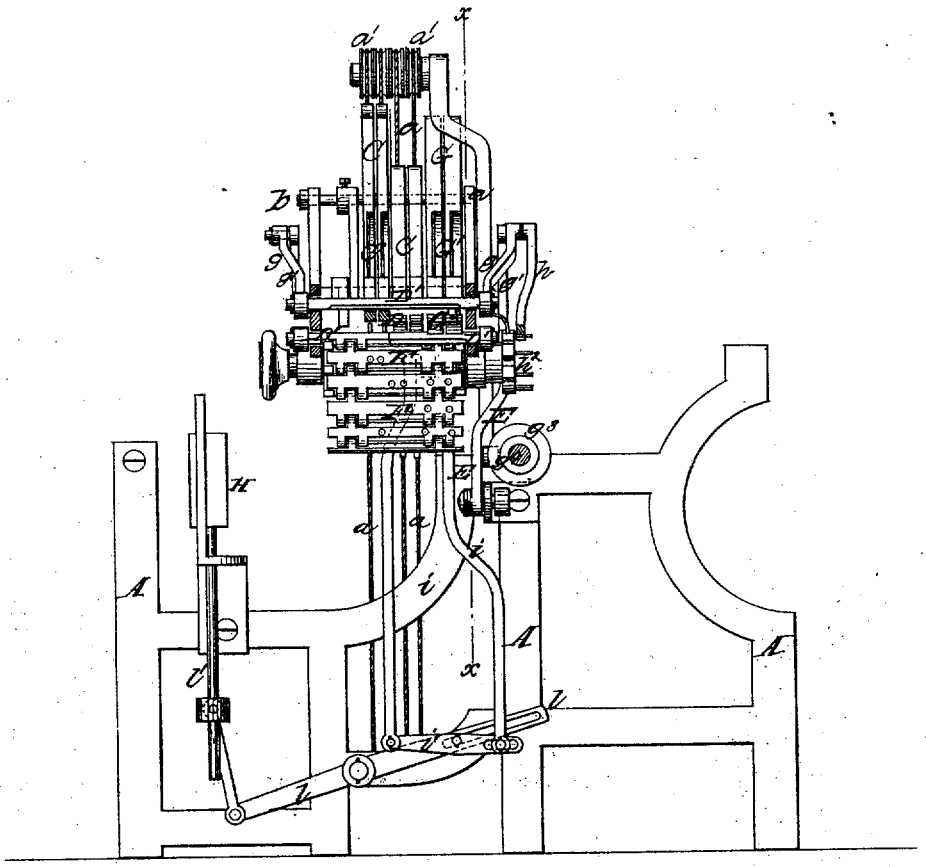
Figure 3:
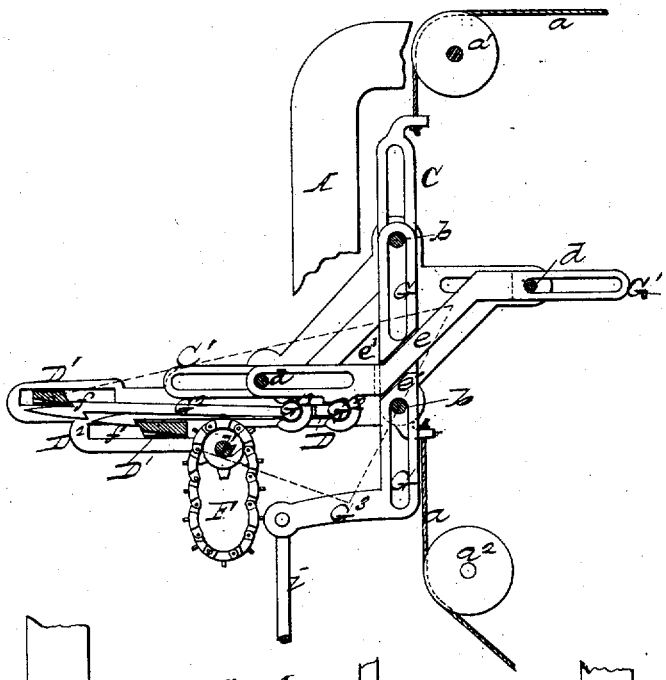
Figure 4:
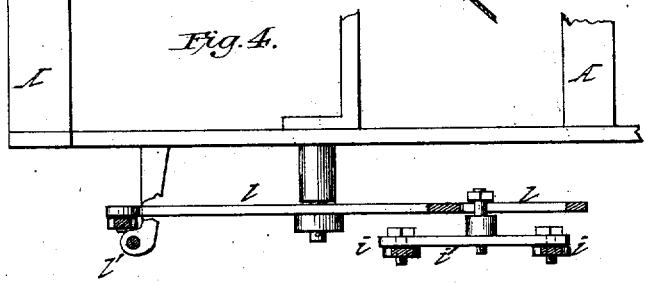

Figure 1 is a rear elevation of part of a loom, showing my improved shuttle-box motion applied thereto. Fig. 2 is an end elevation of the same, partly in vertical transverse section. Fig. 3 is a vertical longitudinal section on line *x x* of Fig. 2 on enlarged scale; and Fig. 4 is a detail top view, partly in horizontal section, on line *y y* of Fig. 1.

This invention has relation to an improved shuttle-box motion for looms, by which springs are dispensed with and an easy and reliable movement is obtained; and it consists of the parts comprising the box-motion, substantially as hereinafter more fully set forth, and particularly pointed out in the claims.

In the drawings, A refers to the loom-frame, and B to the heddles.

The shuttle-boxes are operated by vertically and horizontally sliding bars G G′, the latter having angular middle portions which move in correspondingly-shaped recesses in the sides of the vertical bars G, and act to raise or depress such bars, both the bars G and G′ having slots and being guided on the pins *b d*. The horizontal bars G′ are provided with jacks $G^2$, jointed thereto, and provided at their outer ends with projections *f*, which are engaged by the reciprocating lifter and depressor bars D′ to move the bars G′. The vertical bars G are provided at their lower ends with angular or oblique arms $G^3$, connected by rods *i* to a lever *i′*. The lever *i′* is centrally pivoted in the slotted end of a lever, *l*, fulcrumed to the loom-frame. The opposite end of the lever *l* is connected by a pivot-link and swiveled clamp-nut to the rod *l′* of the shuttle-boxes H, which are guided in vertical standards. The recesses in the sides of the vertical slide-bars G, in which the angular portions of the bars G′ fit or move, are formed with seats *e′* at their upper and lower ends to fit corresponding seats on the horizontal bars when they have traveled the proper distance, and to lock them in position at the end of their motion in either direction to prevent possibility of slipping or producing imperfect cloth. The reciprocating lifter and depressor bars operate upon the jacks $G^2$ in the order determined by the pattern-chain F, which passes around the roller *h′*, turned by means of the ratchet-wheel $h^2$, on the end of the roller, and the pawl *h*. The pawl *h* is connected to a lever, *g′*, operated by a link, $g^2$, pivoted to a lever, E, carrying a friction-roll, which plays in the spiral groove of the wheel $g^3$ on the driving-shaft.

It is obvious that the heddles may be operated, as shown, by sliding bars similar to those employed for moving the shuttle-boxes.

From the foregoing it will be observed that I dispense with all springs and secure an easy and reliable movement, the latter resulting directly from the angular portions of the horizontal bars.

Having thus fully described my invention, I claim and desire to secure by Letters Patent—

1. The combination of the vertically-sliding bars G, provided with angular arms $G^3$, the horizontally-sliding bars G′, having the jacks $G^2$ jointed thereto, and their actuating mechanism, the lever *i′*, and connecting-rods *i*, with the end-slotted lever *l*, the pivot link, swiveled clamp-nut, and the shuttle-box rod *l′*, as and for the purpose specified.

2. The combination, with the vertically-sliding bars G, provided with angular arms $G^3$, and having inclined recesses midway of their length, and formed with seats *e′*, of the horizontally-sliding bars G′, having the inclined middle portions, *e*, the jacks $G^2$, jointed to said bars G′, and operating mechanism, substantially as and for the purposes set forth.

In testimony whereof I hereto affix my signature in presence of two subscribing witnesses.

JOHN BARKER.

Witnesses:

THOMAS THORNLEY,

MASON ELLEARY.